(12) United States Patent
Mutlu et al.

(10) Patent No.: US 11,029,442 B2
(45) Date of Patent: Jun. 8, 2021

(54) SELF-MIXING OPTICAL PROXIMITY SENSORS FOR ELECTRONIC DEVICES

(71) Applicant: Apple Inc., Cupertino, CA (US)

(72) Inventors: Mehmet Mutlu, Stanford, CA (US); Mark T. Winkler, San Jose, CA (US); Tong Chen, Cupertino, CA (US); Wenrui Cai, San Jose, CA (US)

(73) Assignee: Apple Inc., Cupertino, CA (US)

( * ) Notice: Subject to any disclaimer, the term of this patent is extended or adjusted under 35 U.S.C. 154(b) by 140 days.

(21) Appl. No.: 16/351,843

(22) Filed: Mar. 13, 2019

(65) Prior Publication Data

US 2019/0331828 A1 Oct. 31, 2019

Related U.S. Application Data

(60) Provisional application No. 62/663,599, filed on Apr. 27, 2018.

(51) Int. Cl.
| | | |
|---|---|---|
| *G01V 8/10* | (2006.01) | |
| *G01V 8/12* | (2006.01) | |
| *H04R 1/02* | (2006.01) | |
| *H04R 29/00* | (2006.01) | |
| *G06F 3/041* | (2006.01) | |

(52) U.S. Cl.
CPC .............. *G01V 8/10* (2013.01); *G06F 3/0416* (2013.01); *H04R 1/025* (2013.01); *H04R 29/001* (2013.01)

(58) Field of Classification Search
CPC ....... G06F 3/0416; G06F 3/0421; G01V 8/10; G01V 8/12; H04R 1/025; H04R 29/001; G01B 9/02092; G02B 26/0833
See application file for complete search history.

(56) References Cited

U.S. PATENT DOCUMENTS

| | | | |
|---|---|---|---|
| 7,268,705 B2 | 9/2007 | Kong | |
| 7,495,775 B2 | 2/2009 | Carr | |
| 8,982,339 B2 | 3/2015 | Schönleber et al. | |
| 9,857,287 B2 * | 1/2018 | Dittrich | G01N 15/0205 |

(Continued)

*Primary Examiner* — David P Porta
*Assistant Examiner* — Fani Boosalis
(74) *Attorney, Agent, or Firm* — Treyz Law Group, P.C.; G. Victor Treyz; Joseph F. Guihan

(57) ABSTRACT

An electronic device may have optical sensors. Control circuitry may use sensor measurements in controlling adjustable components and taking other actions. The optical sensors may be self-mixing sensors such as incoherent self-mixing sensors. One or more sensors may be used in gathering sensor measurements. In configurations in which an electronic device contain multiple self-mixing sensors, multi-wavelength measurements can be gathered using incoherent light sources in the sensors that operate a set of different wavelengths. The light source of each incoherent self-mixing sensor may be a superluminescent light-emitting diode, a resonant cavity light-emitting diode, or other amplified or non-amplified spontaneous emission source. Optical systems such as lenses in a housing for an electronic device may be aligned with the self-mixing sensors. Self-mixing sensors may serve as proximity sensors, sensors for detecting touch input, sensors for measuring spectrums associated with targets of unknown materials, displacement sensors, or other sensors.

20 Claims, 9 Drawing Sheets

(56) References Cited

U.S. PATENT DOCUMENTS

| | | | |
|---|---|---|---|
| 2005/0156874 A1* | 7/2005 | Kong | G06F 3/0421 |
| | | | 345/156 |
| 2012/0120375 A1* | 5/2012 | Kilcher | H04N 9/3194 |
| | | | 353/98 |
| 2013/0038565 A1* | 2/2013 | Elloway | G06F 3/0412 |
| | | | 345/174 |
| 2017/0094389 A1* | 3/2017 | Saulsbury | H04R 1/1016 |
| 2018/0224368 A1* | 8/2018 | Spruit | G01S 7/4916 |
| 2019/0037136 A1* | 1/2019 | Downing | G01S 7/4865 |
| 2019/0090068 A1* | 3/2019 | Fishman | H01S 5/0425 |

* cited by examiner

SELF-MIXING OPTICAL PROXIMITY SENSORS FOR ELECTRONIC DEVICES

This application claims the benefit of provisional patent application No. 62/663,599, filed Apr. 27, 2018, which is hereby incorporated by reference herein in its entirety.

FIELD

This relates generally to electronic devices, and, more particularly, to optical sensors for electronic devices.

BACKGROUND

Electronic devices may contain optical sensors. For example, earbuds may contain optical proximity sensors based on infrared light-emitting diodes and infrared photodetectors. An optical proximity sensor may use an infrared light-emitting diode to emit infrared light. The emitted infrared light may reflect or backscatter off of an object in the vicinity of the proximity sensor. The strength of the reflected or backscattered light may be measured using an infrared photodetector to determine whether the object is near or far from the sensor. An earbud can use a proximity sensor to gather information on the operating state of the earbud such as whether the earbud has been inserted into the ear of a user. A cellular telephone may also use a proximity sensor to detect whether a touch screen in the cellular telephone is adjacent to a user's head.

Challenges can arise in gathering operating state information with an optical proximity sensor. For example, the intensity of emitted infrared light that is reflected or backscattered from a nearby object can be affected by the reflectivity and bidirectional reflectance distribution function (BRDF) of the object, which can lead to measurement inaccuracies.

SUMMARY

An electronic device may have one or more optical sensors. Control circuitry in the electronic device may use sensor measurements from the optical sensors in controlling adjustable components and taking other actions. For example, an electronic device may have adjustable components such as a speaker, a touch screen display, a haptic output device, a motor or other actuator, and/or other components. The control circuitry can adjust components such as these using sensor measurements from the optical sensors.

The optical sensors may be self-mixing sensors such as resonant-cavity light-emitting diode self-mixing sensors or other self-mixing sensors based on incoherent light sources (e.g., a light-emitting diode, a superluminescent diode, or other amplified or non-amplified spontaneous-emission-based source of electromagnetic radiation). One or more sensors may be used in gathering sensor measurements. In configurations in which an electronic device contain multiple self-mixing sensors, spectral measurements can be gathered using light-emitting diodes in the sensors operating at a set of different wavelengths. The light-emitting diode of each resonant-cavity light-emitting diode self-mixing sensor may be a visible-light diode, an ultraviolet diode, or an infrared diode.

An optical system containing optical components such as lenses may be mounted in a housing sidewall or other housing structure for an electronic device. The optical system may be aligned with one or more self-mixing sensors in the housing. Self-mixing sensors may serve as proximity sensors, sensors for detecting touch input, displacement sensors, sensors for measuring spectrums associated with targets of unknown materials, or other sensors.

DETAILED DESCRIPTION

Figure 1:
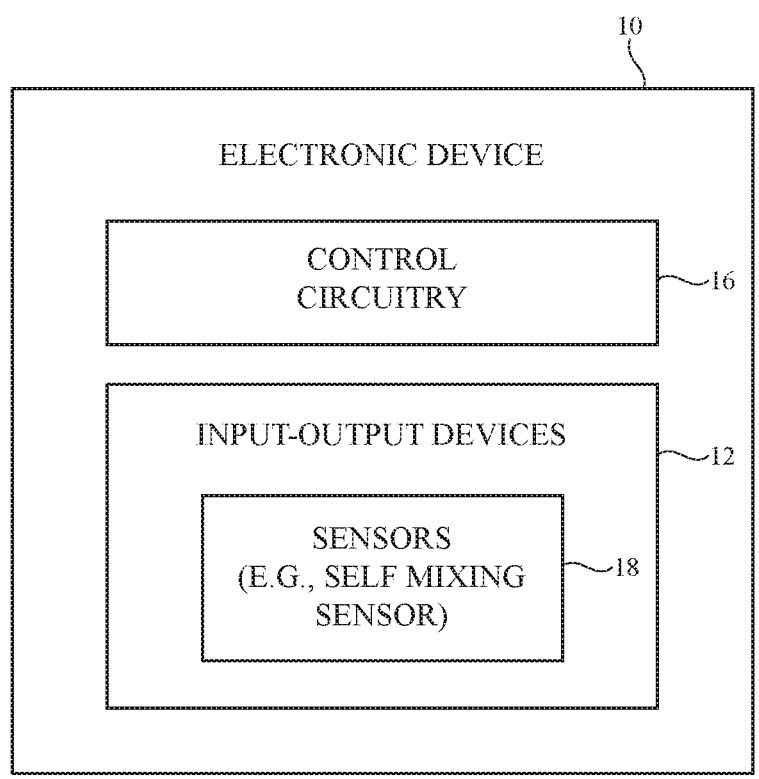
FIG. 1 is a schematic diagram of an illustrative electronic device having a self-mixing sensor in accordance with an embodiment.

An illustrative electronic device of the type that may be provided with one or more optical sensors such as self-mixing sensors is shown in FIG. 1. Electronic device 10 may be a computing device such as a laptop computer, a computer monitor containing an embedded computer, a tablet computer, a cellular telephone, a media player, or other handheld or portable electronic device, a smaller device such as a wristwatch device, a pendant device, a headphone or earpiece device such as a wireless earbud, a device embedded in eyeglasses or other equipment worn on a user's head, or other wearable or miniature device, a television, a computer display that does not contain an embedded computer, a gaming device, a navigation device, an embedded system such as a system in which electronic equipment is mounted in a kiosk or automobile, a cover for a tablet computer or other device, a keyboard in a cover, a keyboard in a computer, a stand-alone keyboard accessory, a mouse or other pointing device, a stylus, a voice-controlled speaker device, equipment that implements the functionality of two or more of these devices, or other electronic equipment. Illustrative configurations in which electronic device 10 is an earbud may sometimes be described herein as an example.

As shown in FIG. 1, electronic device 10 may have control circuitry 16. Control circuitry 16 may include storage and processing circuitry for supporting the operation of device 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 16 may be used to control the operation of device 10. The processing circuitry may be based on one or more microprocessors, microcontrollers, digital signal processors, baseband processors, power management units, audio chips, application specific integrated circuits, etc.

Electrical components in device 10 such as input-output devices 12 may be used to allow data to be supplied to device 10, to allow data to be provided from device 10 to external devices, and/or to perform other functions in device 10. Control circuitry 16 and input-output devices 12 may be mounted in a housing for device 10 (e.g., a housing formed from polymer, glass, ceramic, metal, other materials, and/or combinations of these materials).

Input-output devices 12 may include buttons, joysticks, scrolling wheels, touch pads, key pads, keyboards, microphones, speakers, tone generators, vibrators, cameras, light-emitting diodes and other status indicators, displays (e.g., organic light-emitting diode displays, liquid crystal displays, displays with touch screens, displays without touch screens, etc.), data ports, other adjustable components (e.g., motors, haptic output devices, adjustable touch sensors in displays, etc.). A user can control the operation of device 10 by supplying commands through input-output devices 12 and may receive status information and other output from device 10 using the output resources of input-output devices 12.

Input-output devices 12 may also include sensors 18. Sensors 18 may include one or more sensors such as an ambient light sensor, a capacitive proximity sensor, a magnetic sensor, an inertial measurement unit (e.g., a sensor that includes an accelerometer, compass, and/or gyroscope for measuring motion and orientation), a force sensor, a capacitive touch sensor, a temperature sensor, a pressure sensor, a gas sensor, a microphone, a depth sensor, a three-dimensional gesture sensor, a structured light sensor for gathering depth information, a touch sensor in a touch screen display, or other sensors.

Sensors 18 may include one or more optical sensors such as self-mixing sensors. Self-mixing sensors may contain a device that emits visible or invisible electromagnetic radiation (e.g., an amplified or non-amplified spontaneous-emission-based source of electromagnetic radiation). A portion of this emitted radiation can be coupled back to this radiation-emitting device via reflection or scattering from an object, which can be defined by a reflectivity and bidirectional reflectance distribution function in the beam path and creates feedback (e.g., by altering the carrier density in a solid state device). This feedback can be measured by electrical sensing, optical sensing, and/or other sensing arrangements, and used in producing sensor output.

Optical self-mixing sensors for device 10 may be based on resonant-cavity light-emitting diodes (resonant-cavity LEDs or RC-LEDs). Such light-emitting diodes have coherence lengths on the order of tens of microns so that for operating ranges that are larger than tens of microns, they are incoherent. Accordingly, self-mixing sensors based on resonant-cavity light-emitting diodes may sometimes be referred to herein as incoherent self-mixing sensors. If desired, incoherent self-mixing sensors can be implemented using other low-coherence or incoherent light sources such as superluminescent diodes and light-emitting diodes other than RC-LEDs.

Incoherent self-mixing sensors (e.g., resonant-cavity light-emitting diode self-mixing sensors, etc.) may be used in forming optical proximity detectors and other sensing devices in device 10. An optical proximity detector may detect when a person's body part (e.g., ear, head, fingers, etc.) or other external object is near to the optical proximity detector. In some configurations, resonant-cavity light-emitting diode self-mixing sensors may be used in an electronic device to detect finger gestures, key press input and/or other purposeful user input (e.g., self-mixing sensors may serve as touch sensors that detect finger contact with a surface in a keyboard and thereby receive key press input. Self-mixing sensors may also detect touch sensor input as a user moves one or more fingers or other objects across a touch surface and may perform other user input functions (e.g., by detecting button press input, and/or other user input).

In some configurations, incoherent self-mixing sensors can be used to measure the horizontal or vertical displacement with respect to the direction of light propagation of a movable structure in device 10. For example, a resonant-cavity light-emitting diode self-mixing sensor may monitor movement of a diaphragm in a speaker or other movable structures in an electronic device component. By monitoring the excursions of a speaker diaphragm, audio drive signals can be adjusted to compensate for speaker distortion and/or scenarios in which a speaker has a potential for being over driven may be avoided. Another possibility is the detection of horizontal movement when the target surface has a spatially varying reflectance and/or bidirectional reflectance distribution function. In this case, the time-varying feedback can be used to deduce the horizontal movement. This can be used, for example, with an optical watch crown in an electronic device such as a wristwatch.

If desired, incoherent self-mixing sensors can be used to measure the optical properties of gases, solids, or liquids. For example, one or more incoherent self-mixing sensors may be used to gather infrared light measurements on the environment in which an electronic device is operating. Such light measurements may be sensitive to the optical properties of the air surrounding the device and/or the optical properties of objects in the vicinity of the device. In some arrangements, spectral data may be gathered that can be used in identifying materials in the environment of an electronic device. For example, incoherent self-mixing sensor measurements can be used to gather spectral curves for objects in the vicinity of an electronic device and/or measurements on the air surrounding an electronic device.

Incoherent self-mixing sensors can be used in any suitable type of electronic device (e.g., one or more of devices 10 of FIG. 1). In one illustrative configuration, a self-mixing sensor based on a resonant-cavity light-emitting diode or other source of electromagnetic radiation is used in forming a wearable electronic device.

Figure 2:
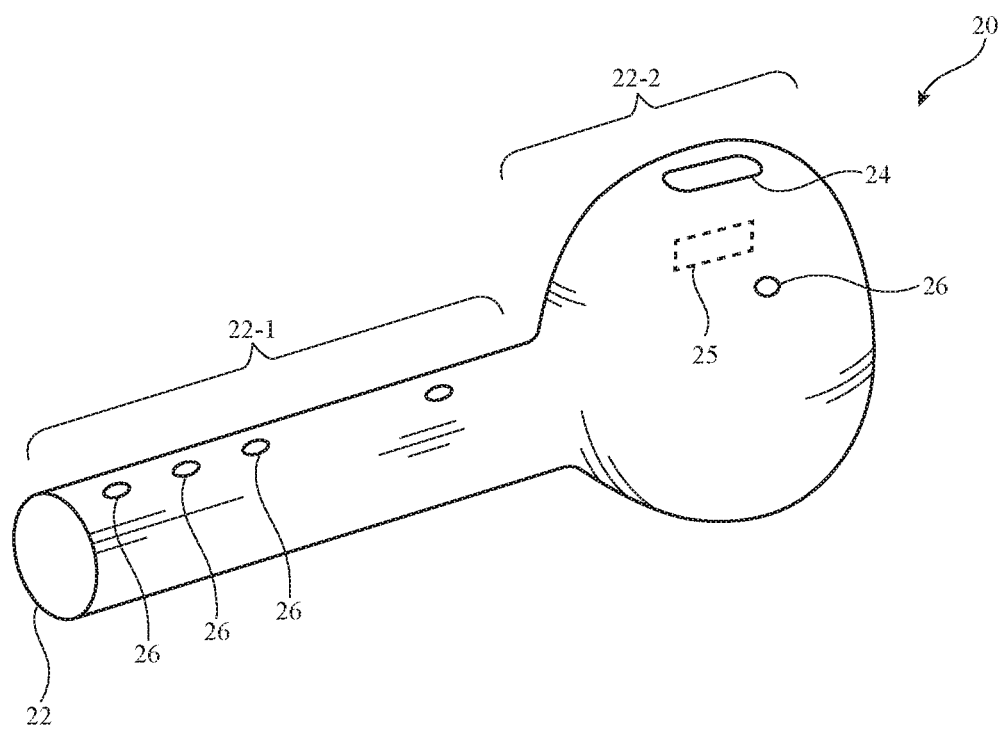
FIG. 2 is a perspective view of an illustrative electronic device such as an earbud with a self-mixing sensor in accordance with an embodiment.

FIG. 2 is a perspective view of an illustrative wearable electronic device such as a wireless earbud. Wireless earbud 20 may have a speaker such as speaker 25 mounted in alignment with an opening in housing 22 such as speaker port 24. Housing 22 may be formed from polymer, glass, ceramic, metal, fabric, other materials, and/or combinations of these materials. As an example, housing 22 may be formed from a rigid polymer. Housing 22 may include stalk portion 22-1 and ear portion 22-2. Speaker port 24 may be formed in ear portion 22-2, which is configured for insertion into the ear of a user. Stalk portion 22-1 may have an elongated shape that protrudes from ear portion 22-2.

During insertion of earbud 20 into an ear of a user, a user's fingers may grasp stalk portion 22-1 (as an example). Earbud 20 may have one or more self-mixing sensors at locations such as locations 26. The self-mixing sensors may serve as proximity sensors and/or touch sensors (as examples). Self-mixing sensors may be formed on ear portion 22-2 (e.g., to form proximity sensors that monitor when ear portion 22-2 is adjacent to portions of a user's ear and thereby determine when earbud 20 is in a user's ear). If desired, self-mixing sensors may also be formed on stalk portion 22-1. In configurations in which self-mixing sensors are located on stalk portion 22-1, the sensors can be used to monitor when a user is grasping stalk 22-1. Stalk-mounted sensors and/or sensors on ear portion 22-2 (e.g., a one-dimensional or two-dimensional arrays of sensors) may serve as a touch sensor to gather user finger input. For example, a touch sensor formed from self-mixing sensors may gather finger touch input such as user taps on stalk portion 22-1, user finger swipes along the length of stalk portion 22-1, and/or other user input (sometimes referred to as finger gestures or finger input).

Figure 3:
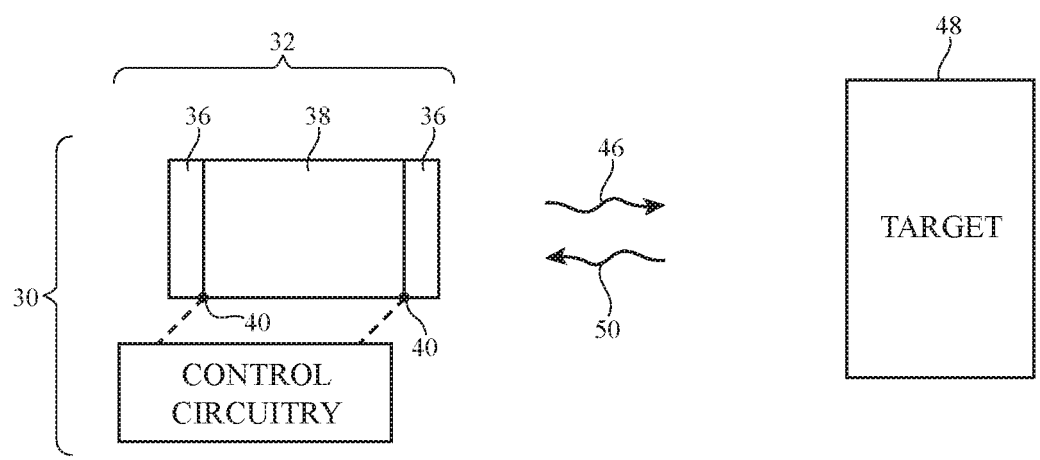
FIG. 3 is a side view of an illustrative resonant-cavity light-emitting diode and an associated external target in a self-mixing sensor in accordance with an embodiment.

FIG. 3 is a diagram of an illustrative incoherent self-mixing sensor and an associated target. As shown in FIG. 3, self-mixing sensor 30 may include a low-coherence or incoherent electromagnetic radiation source such as resonant-cavity light-emitting diode 32. Light-emitting diode 32 may have mirrors 36. Mirrors 36 may be formed from reflective layers such as metal layers and/or thin-film interference filter mirrors (sometimes referred to as Bragg reflectors) formed from stacks of thin-film layers of alternating index of refraction. Mirrors 36 form a Fabry-Perot cavity.

Semiconductor active region 38 may be formed between mirrors 36. Active region 38 may, if desired, include quantum well structures configured to allow light-emitting diode 32 to produce light at a desired output wavelength. The left-hand mirror in light-emitting diode 32 of FIG. 3 may have a nominal reflectivity approaching 100%. The right-hand mirror in light-emitting diode 32, which serves as an output mirror for light-emitting diode 32, may be moderately reflected compared to the left-hand mirror. The reflectivity of the right-hand mirror may, for example, be about 90% and is therefore is not as high the output mirror reflectivity in a laser (where output mirror reflectivity may be greater than 99%). As a result, while light-emitting diode 32 may exhibit an enhanced spontaneous emission rate due to the Fabry-Perot cavity formed from mirrors 36, light-emitting diode 32 does not lase and does not form a laser. Compared to non-resonant-cavity light-emitting diodes, resonant-cavity light-emitting diode 32 exhibits reduced bandwidth (e.g., a bandwidth of about 100 nm to 30 nm, less than 120 nm, at least 20 nm, at least 25 nm, at least 35 nm, less than 110 nm, less than 95 nm, or other suitable bandwidth) and exhibits a narrower emission angle (e.g., +/−an angle A having a value of at least 10°, at least 15°, at least 20°, at least 25°, less than 35°, less than 30°, less than 25°, or other suitable value associated with a narrow angular range of light emission).

If desired, other types of incoherent light sources may be used in forming incoherent self-mixing sensor 30. For example, an edge-emitting light-emitting diode may be used that produces light output from edge of a light-emitting diode die or a surface-emitting light-emitting diode may be used that produces light output from the surface of a light-emitting diode die. Typical bandwidths for these light-emitting diodes are about 100 nm (full-width half maximum). In some configurations, superluminescent diodes may be used as incoherent light sources. A superluminescent light-emitting diode may be formed from an edge-emitting diode structure that generates output partially from stimulated emission. The output of a superluminescent light-emitting diode is higher than the edge-emitting or surface-emitting light-emitting diode and may be characterized by a bandwidth of 30-40 nm (as an example).

During operation, resonant-cavity light-emitting diode 32 may be controlled by applying a signal to terminals 40 using control circuitry 16 (e.g., a bias circuit in circuitry 16). This causes light-emitting diode 32 to emit light 46. Light 46 illuminates target 48, which reflects a portion of emitted light 46 back towards light-emitting diode 32 as reflected light 50. Target 48 may be an optically flat surface (e.g., a specular reflector), may be an optically rough surface with diffusive/scattering properties, and/or can be defined by a bidirectional reflectance distribution function that is suitable for the operation of sensor 30.

Emitted light 46 and therefore reflected light 50 may have any suitable wavelength such as a visible light wavelength (e.g., 390 nm to 700 nm), an ultraviolet light wavelength (e.g., less than 390 nm), an infrared wavelength, a near-infrared wavelength (e.g., 0.75-1.4 microns), a short-wavelength infrared (e.g., 1.4-3 microns), a mid-wavelength infrared wavelength (e.g., 3-8 microns), a wavelength of at least 1 micron, at least 1.5 microns, at least 2 microns, at least 3 microns, at least 3.5 microns, at least 5 microns, less than 10 microns, less than 8 microns, or other suitable wavelength. In some configurations, multiple light-emitting diodes 32 may be incorporated into device 10. In these configurations, output light 46 may have any suitable set of shared and/or different wavelengths such as these.

Target 48 may be, for example, a user's body part (e.g., ears, fingers, etc.), a glass or polymer layer in a building, vehicle, electronic device, or other object, a thin-film interference filter formed from a stack of dielectric layers configured to form a wavelength-dependent optical filter and/or a dielectric mirror, a metallic reflector, other optical filters and/or mirrors, a gaseous substance (e.g., ambient air), a liquid, solid materials such as ceramic, crystalline materials such as sapphire, natural materials such as wood or leather, polymers, inorganic dielectrics, metals, other materials, and/or combinations of any two or more of these materials.

Some of light 50 that is directed back towards light-emitting diode 32 (e.g., light that reflected backwards due to a specular reflection from target 48 and/or that is backscattered from a diffuse surface of target 48) reenters light-emitting diode 32 and perturbs the carrier density in light-emitting diode 32 through the modification of the steady-state photon density and distribution within the device. This perturbation of the carrier density in light-emitting diode 32 causes changes in the current and junction voltage and emitted optical power of light-emitting diode 32 in relation to the amount of light 50 that reenters light-emitting diode. These changes in the electrical characteristics of light-emitting diode 32 can be detected using sensing circuitry in control circuitry 16. Circuitry 16 may, as an example, include a voltage sensor that measures the junction voltage of light-emitting diode 32 across active region 38 and/or a current sensor that measures the current flowing through diode 32 (e.g., the current flowing through terminals 40).

In another embodiment, a photodiode placed under, above, or adjacent to the emitter can be used to detect changes in the emitted optical power. These changes can then be used to produce a sensor output.

In some configurations, the self-mixing behavior of light-emitting diode 32 may be used to form a distance sensor capable of estimating distance between sensor 30 and a target object. For a diffusive target, the intensity of light 50 that is reenters light-emitting diode 32 is proportional to $1/X^2$, where X is the distance separating light-emitting diode 32 of sensor 30 and target 48. As a result, sensor 30 may be used to measure distance X between sensor 30 and target 48 when the target reflectance and bidirectional reflectance distribution function is known. If desired, sensor 30 may, as an example, be configured to serve as a proximity sensor (e.g., a distance sensor in which the light signal reflecting from objects is compared to a threshold distance or is otherwise processed to determine whether the objects are located within the vicinity of sensor 30).

The amount of light 50 that is sensed by light-emitting diode 32 is also affected by the optical properties of target 48. This allows sensor 30 to gather information on the material(s) making up target 48. As an example, if a first target 48 strongly absorbs or transmits light at a particular wavelength or set of wavelengths, whereas a second target 48 reflects this light, control circuitry 16 can determine that the first and second targets 48 are formed from different materials and/or can use spectral measurements to identify particular materials.

Figure 4:
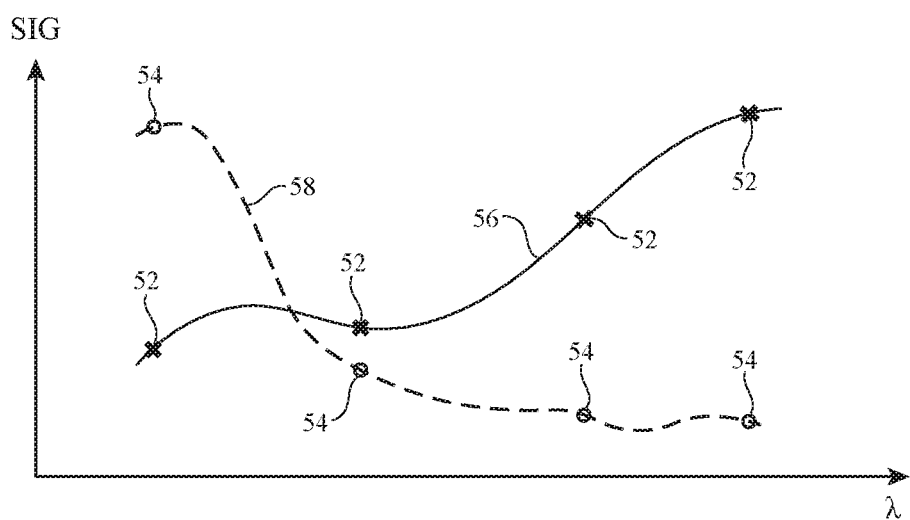
FIG. 4 is a graph showing illustrative spectral measurements for items being measured with a self-mixing sensor in accordance with an embodiment.

In arrangements in which multi-spectral measurements (measurements at multiple wavelengths) can be made using sensors 30, control circuitry 16 can use target spectral characteristics in identifying the nature of targets 48. Consider, as an example, the graph of FIG. 4. In the example of FIG. 4, a set of sensors 30 has been used to gather sensor measurements at multiple different wavelengths λ. In each sensor 30, the output (voltage and/or current) of the light-emitting diode 32 in that sensor varies as a result of feedback from reflection and/or backscattering of its emitted light 46, and these variations (e.g., signal SIG of FIG. 4) can be plotted as a function of wavelength. There are four different sensors 30 in the illustrative electronic device of FIG. 4, allowing a four-wavelength spectrum of measurements of signal SIG to be made. In a first set of measurements with sensors 30, sensor measurements 52 are collected. In a second set of measurements with sensors 30, sensor measurements 54 are collected. Sensor measurements 52 match the reflectivity (backscattering) spectrum of a first target 48 formed from a first material (curve 56), whereas sensor measurements 54 match the spectrum of a second target 48 formed from a second material (curve 58). Light absorption, reflection, and/or transmission, which are related properties, may be affected by the wavelength of light 46 and 50. As a result, spectral measurements with sensor 30 (e.g., the spectrums of signal SIG illustrated by measured data points 54 and 52 in the FIG. 4 example) can be used in characterizing different materials in target 48.

Figure 5:
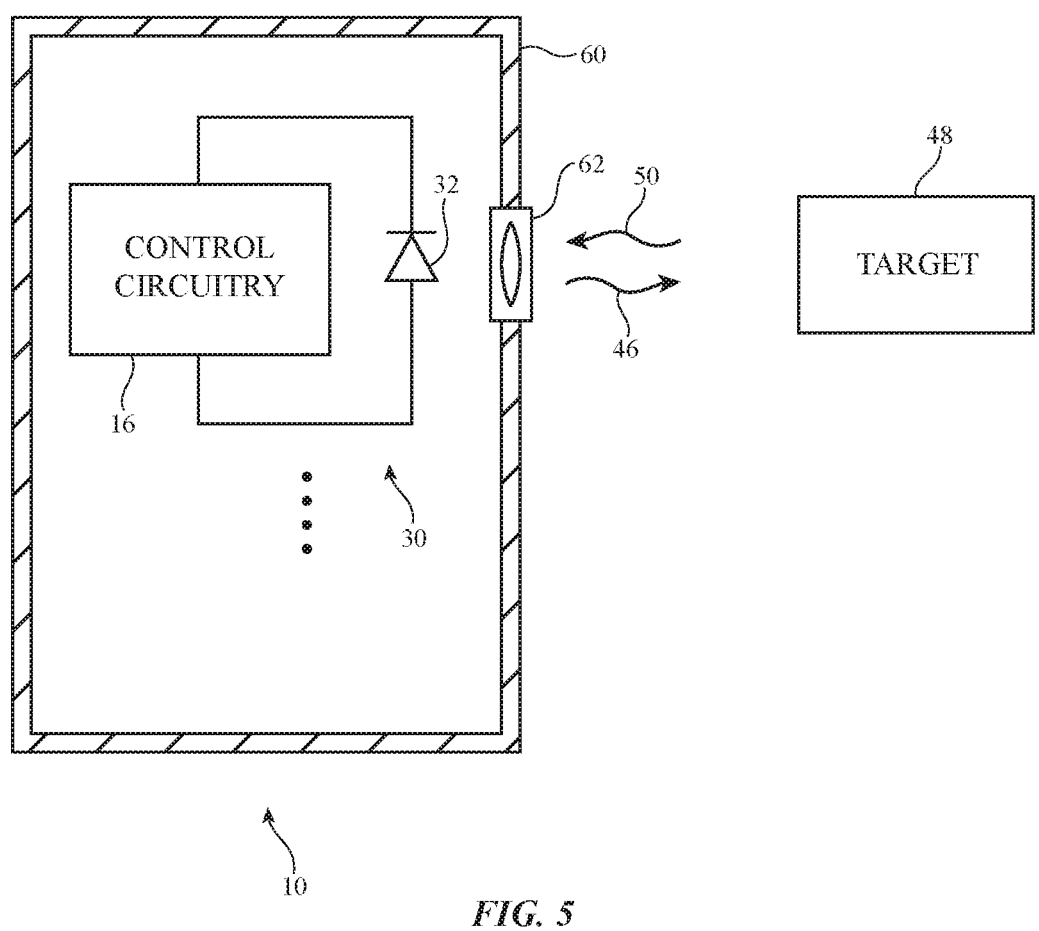
FIG. 5 is a diagram of an illustrative electronic device with a self-mixing sensor in accordance with an embodiment.

FIG. 5 is a diagram of an illustrative electronic device with a self-mixing sensor 30 formed from a resonant-cavity light-emitting diode. As shown in FIG. 5, the circuitry of device 10 such as control circuitry 16 and input-output devices such as light-emitting diode 32 for one or more self-resonant sensors 30 may be mounted within housing 60 for device 10. Housing 60 (e.g., housing 22 of device 10 of FIG. 2) may be formed form polymer, metal, glass, ceramic, crystalline material such as sapphire, other materials, and/or combinations of these materials. In some arrangements, housing 60 may be opaque to the wavelength(s) of light being measured using sensor 30. If desired, one or more optical systems (e.g., lenses, transparent windows, diffractive structures, optical filters, etc.) such as optical system 62 may be formed in device 10. Optical system 62 may, as an example, include one or more lenses and/or non-lensing window structures. Filters (e.g., a visible-light-blocking-and-infrared-light-transmitting filter, a filter that blocks other visible and/or infrared wavelengths, or other filters) may also be included in optical system 62.

During operation, light 46 that is emitted by light-emitting diode 32 may pass through optical system 62 and reflected or scattered light 50 may pass through optical system 62. In configurations in which light 46 is in the visible spectrum, optical system 62 may be formed from material that is transparent at visible light wavelengths (e.g., glass, polymer, sapphire, etc.). At longer wavelengths (e.g., infrared wavelengths up to mid-wavelength infrared, as an example), other materials may be used (e.g., chalcogenide glass, calcium fluoride, silicon, germanium, zinc selenide, and/or other materials that are transparent at these infrared wavelengths).

Figure 6:
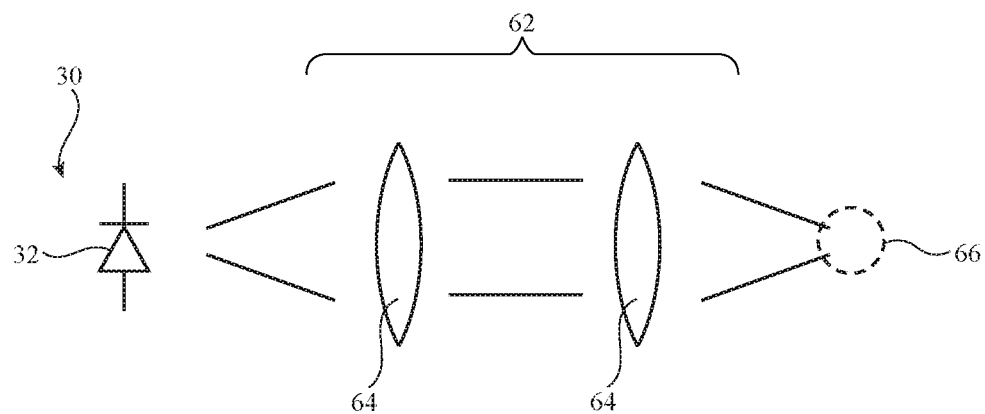
FIG. 6 is a diagram of an illustrative two-lens optical system for use with a self-mixing sensor in accordance with an embodiment.

To measure a sample such as an air sample or a sample of other gas, optical system 62 may include multiple lenses such as lenses 64 of FIG. 6. Using this type of optical system, light emitted by light-emitting diode 32 may be collimated and then focused on a target such as a volume of air (e.g., target 48 may be formed form the air in target area 66). Air or other gases and/or particulates in target area 66 reflect (backscatter) light 50 back to light-emitting diode 32. In this way, the optical properties of the air, other gases, and/or particulates or other materials in target area 66 may be measured by sensor 30. Light-emitting diodes 32 at multiple different wavelengths can be used in the arrangement of FIG. 6 and/or other configurations for device 10 to gather spectral information. In some embodiments, optical system 62 may include a single lens. In other configurations, multiple lenses 64 may be used. Optical filters, phase, plates, spatial light modulators, diffractive elements, and other optical elements may be included in optical system 62 (e.g., one or more of these components may be placed between a pair of lenses 64).

Figure 7:
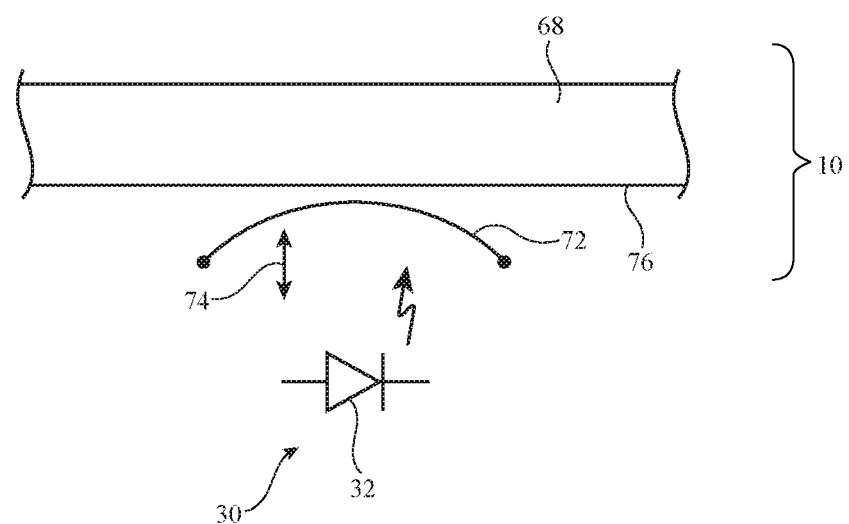
FIG. 7 is a side view of an illustrative self-mixing sensor monitoring a speaker diaphragm in accordance with an embodiment.

In the illustrative arrangement of FIG. 7, device 10 includes a component with a movable structure such as a speaker with a movable diaphragm. In the example of FIG. 7, diaphragm 72 vibrates in directions 74 near to structure (member) 68 (e.g., a display cover layer or other structure in device 10 (e.g., a housing member, an internal component, etc.). There is a potential for control circuitry 16 (e.g., audio circuitry in circuitry 16) to drive the speaker to forcefully, causing distortion in diaphragm 72 and/or causing potentially damaging contact between speaker diaphragm 72 and adjacent surface 76 of structure (member) 68. By monitoring the displacement of diaphragm 72 during operation (e.g., by measuring diaphragm movement in directions 74), control circuitry 16 can use sensor 30 to detect potential distortion and/or damaging contact. Control circuitry 16 can then take suitable actions in response (e.g., by limiting playback volume, by deactivating the speaker, by modifying the audio signal supplied to the speaker to compensate for distortion (e.g., by adjusting equalization settings in the audio circuitry, adding compression, etc.).

Figure 8:
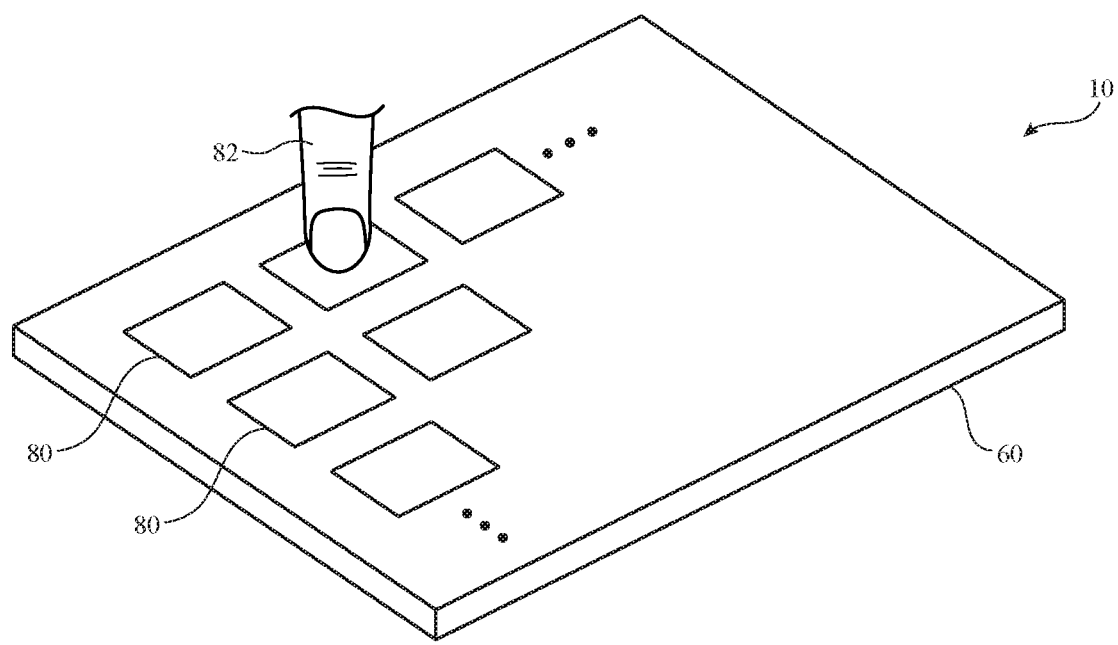
FIG. 8 is a perspective view of an illustrative device such as a keyboard device with an array of areas such as key regions with respective self-mixing sensors to detect key press input or other input in accordance with an embodiment.

FIG. 8 is a perspective view of device 10 in an illustrative configuration in which device 10 has an array of input regions 80 (sometimes referred to as sensing regions) for gathering input from a user. Each input region 80 may have one or more corresponding incoherent self-mixing sensors 30. Using sensors 30 to detect the proximity of an external object such as a user's finger (see, e.g., finger 82 in FIG. 8), the array of input regions 80 can gather touch input (e.g., finger gestures such as taps, swipes, pinch-to-zoom gestures, etc.), can gather key press input (e.g., touches with each of regions 80). If desired, regions 80 may be labeled with keyboard key labels such as alphanumeric labels and which may form a keyboard device. Device 10 of FIG. 8 can also be configured to use sensor(s) 30 to gather button press input, and/or to gather other input from a user's finger, other body parts, and/or other external objects.

Figure 9:
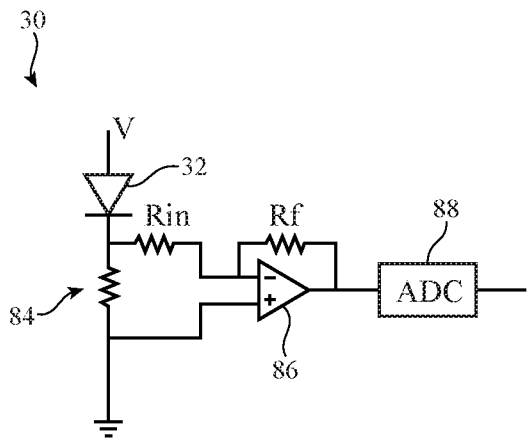
FIGS. 9, 10, and 11 are illustrative self-mixing sensor circuits in accordance with embodiments.
Figure 10:
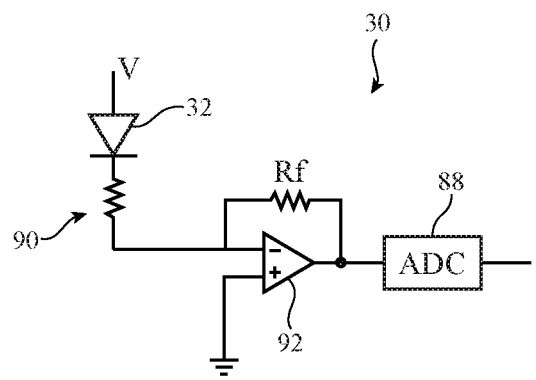
Figure 11:
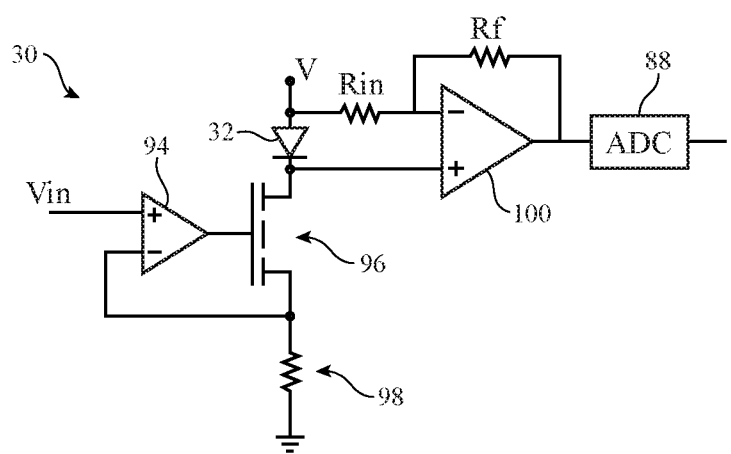

Illustrative sensing (and biasing) circuits that may be used for gathering signals from resonant-cavity light-emitting diode 32 in sensor 30 are shown in FIGS. 9, 10, and 11. These sensing circuits may be incorporated into control circuitry 16 and/or sensor 30 for measuring the changes in the performance of diode 32 in response to optical feedback of light 50 from target 48.

In the example of FIG. 9, light-emitting diode 32 is coupled between power supply V and ground in series with sensing resistor 84. Amplifier 86 supplies the voltage drop across resistor 84, which is proportional to the output of diode 32, to analog-to-digital converter 88. Analog-to-digital converter 88 supplies corresponding digitized data (digital data corresponding to signal SIG of FIG. 4) to processing circuitry in circuitry 16 for additional processing.

If resistor 84 of FIG. 9 is too large (in order to increase the voltage drop associated with the measured output of diode 32), the bias current for diode 32 will be relatively low and the magnitude of light 46 will be relatively small.

To address this issue, sensor 30 of FIG. 10 has an operational amplifier sensing circuit. Resistor 90 is coupled to a first terminal of operational amplifier 92. Ground or a reference voltage is connected to a second terminal of operational amplifier 92. Feedback resistor Rf is coupled between the output of operational amplifier 92 and the first input, thereby forming a transimpedance amplifier. The magnitude of resistor Rf, which influences the gain of the transimpedance amplifier can be relatively large, so the circuit of FIG. 10 may exhibit better signal-to-noise performance than the circuit of FIG. 9.

In the arrangement of FIG. 11, operational amplifier 94 receives control voltage Vin. The output of operational amplifier 94 is coupled to the gate of transistor 96. (In some embodiments, transistor 96 may not be used.) The negative input of operational amplifier 94 is coupled to ground through resistor 98. Operational amplifier 94 and transistor 96 form a voltage-controlled current source (e.g., a current source in which voltage Vin controls the bias current applied by transistor 96 to light-emitting diode 32). In this configuration, self-mixing results in a change of the voltage drop on the light-emitting diode. This voltage drop across light-emitting diode 32 (e.g., the output of diode 32) is measured using voltage amplifier 100. Analog-to-digital converter 88 may be used to digitize the light-emitting diode output signal from amplifier 100. The arrangement of FIG. 11 may allow a constant bias current to be established for light-emitting diode 32 and may be satisfactory for schemes in which the light output of light-emitting diode is modulated (e.g., using a lock-in-amplifier arrangement).

Figure 12:
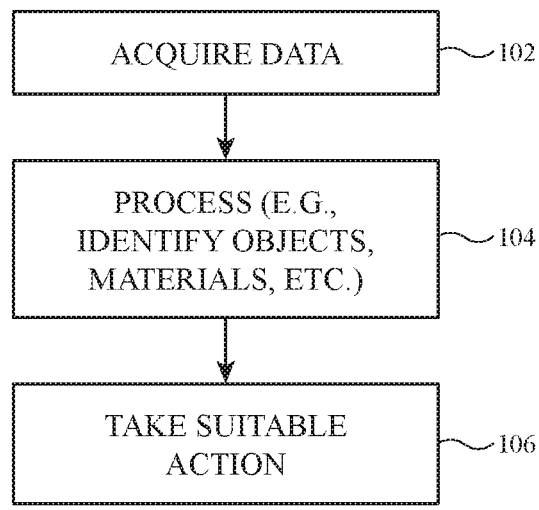
FIG. 12 is a flow chart of illustrative operations involved in gathering and using incoherent self-mixing sensor measurements in accordance with an embodiment.

FIG. 12 is a flow chart of illustrative operations involved in operating electronic device 10. The electronic device may be earbud 20, a keyboard or other item with touch and/or proximity sensor input area such as regions 80 of FIG. 8, a wheeled vehicle, an airborne vehicle such as an unmanned drone or a manned aircraft, or other moving equipment, a laptop computer, a cellular telephone, a tablet computer, a wristwatch device, a computer accessory, and/or other items with electronic equipment.

During the operations of block 102, device 10 may use control circuitry 16 (e.g., sensing circuitry such as the illustrative circuitry of FIGS. 9, 10, and 11) to gather sensor readings from self-mixing sensor 30. Control circuitry 16 may bias resonant-cavity light-emitting diode 32 so that light 46 is emitted. In the presence of a target such as target 48, light 50 is redirected (reflected or scattered) back into light-emitting diode 32 and detectably perturbs the carrier density in light-emitting diode 32. Digital versions of the output signals from light-emitting diode 32 (e.g., sensor readings from analog-to-digital converter circuitry 88 of FIG. 9, 10, or 11) may be processed using processing circuitry in control circuitry 16.

During the operations of block 104, control circuitry 16 may process sensor readings from sensor(s) 30 and/or other data (e.g., data from sensors 18 and/or other data sources). The processing operations of block 104 may be used, for example, to detect the presence of an external object such as a user's finger, head, or other body part, an external object such as an object in the user's environment (e.g., a building, furniture, etc.), to detect the presence of object moving relative to device 10 (e.g., stationary objects through which device 10 is navigating and/or moving objects and/or moving parts in device components), to measure material properties of materials in target 48 (e.g., to distinguish glass from polymer using infrared measurements and/or visible light measurements such as spectral measurements made with sensors 30 operating at a set of multiple different respective wavelengths), and/or to otherwise process the data gathered from light-emitting diode 32. In some configurations, touch input can be detected (e.g., touch gestures such as finger taps, finger swipes, pinch-to-zoom gestures, etc.). Proximity data can be gathered indicating whether objects are in the vicinity of device 10 and sensor 30. For example, data from sensor 30 can be processed to estimate the distance between sensor 30 and external objects over a distance of at least 1 mm, at least 10 mm, at least 10 cm, less than 50 mm, less than 12 mm, or other suitable distance. This distance information may, if desired, be compared to distance threshold information to determine whether objects are in the vicinity of sensor 30 or are not in the vicinity of sensor 30.

During the operations of block 106, control circuitry 16 can take suitable action based on self-mixing sensor data from sensor 30. For example, user input, information on the distance between self-mixing sensor 30 and target 48 (e.g. displacement information for a moving device component and/or information on the separation between sensor 30 and a user body part or other external object), information on the material that forms target 48, and/or other self-mixing sensor information (raw and/or preprocessed data from block 104) can be used in controlling processing circuitry in device 10 or an associated electronic device (e.g., an electronic device such as device 10 or that is linked to device 10 via a wired or wireless communications link). A user may, for example, supply text input, button press input, touch gesture input, three-dimensional gesture input, or other input to a computer or other device. A moving device such as a vehicle may use sensor information to adjust steering motors and/or other adjustable components to avoid obstacles (e.g., obstacles such as glass or plastic walls that appear transparent at visible light wavelength but that are detectable at infrared wavelengths). In a portable electronic device such as a cellular telephone, sensor 30 may serve as a proximity sensor and control circuitry 16 can use proximity information to place device 10 in different modes of operation based on whether external objects are present in the vicinity of device 10. For example, when no objects are near to sensor 30, control circuitry 16 may place control circuitry 16 (and device 10) in a normal operating mode in which a touch screen display in device 10 is configured to gather touch sensor input (e.g., from a user's fingers), whereas when objects are present near to sensor 30, control circuitry 16 may temporarily deactivate the touch sensor in the touch screen display so that contact with the user's head or other nearby object does not inadvertently contact the touch sensor in the touch screen display and supply the touch sensor with erroneous input. In general, any suitable actions may be taken during the operations of block 106 (e.g., controlling adjustable device components such as displays and status indicators to display information, to control adjustable device components such as speakers to provide audio output, to control adjustable components such as touch sensors so that touch sensors are active or inactive, to control adjustable haptic devices to supply haptic output, to control wired and/or wireless components to transmit information to external devices, to control motors and/or other actuators to control movement of wheels, aircraft components, other vehicle steering components, and/or other parts of a moving vehicle, to control motors and actuators in non-vehicular equipment, and/or to control other adjustable circuitry/components in device 10 and/or other equipment).

| Table of Reference Numerals | | | |
|---|---|---|---|
| 10 | Electronic Device | 12 | Input-Output Device |
| 16 | Control Circuitry | 18 | Sensors |
| 20 | Earbud | 22 | Housing |
| 22-1 | Stalk Portion | 22-2 | Ear Portion |
| 24 | Speaker Port | 25 | Speaker |
| 26 | Locations | 30 | Sensor |
| 32 | Light-emitting Diode | 36 | Mirrors |
| 38 | Active Region | 40 | Terminals |
| 46 | Emit Light | 48 | Target |
| 50 | Light | 52 | Sensor Measurements |
| 54 | Sensor Measurements | 60 | Housing |
| 62 | Optical System | 64 | Lenses |
| 66 | Target Area | 68 | Structure |
| 72 | Diaphragm | 74 | Directions |
| 76 | Adjacent Surface | 80 | Input Region |
| 82 | Finger | 84 | Sensing Resistor |
| 86 | Amplifier | 88 | Analog-to-digital converter |
| 90 | Resistor | 92 | Operational Amplifier |
| 94 | Operational Amplifier | 96 | Transistor |
| 98 | Resistor | 100 | Amplifier |

The foregoing is merely illustrative and various modifications can be made to the described embodiments. The foregoing embodiments may be implemented individually or in any combination.

What is claimed is:

1. An electronic device, comprising:
a housing;
an adjustable component in the housing;
an incoherent self-mixing sensor in the housing; and
control circuitry in the housing that is configured to gather a sensor measurement with the incoherent self-mixing sensor and that is configured to adjust the adjustable component using the sensor measurement.

2. The electronic device defined in claim 1 wherein the adjustable component comprises a touch screen display and wherein control circuitry is configured to deactivate a touch sensor in the touch screen display in response to the sensor measurement.

3. The electronic device defined in claim 1 wherein the adjustable component comprises a display and wherein the control circuitry is configured to display information on the display in response to the sensor measurement.

4. The electronic device defined in claim 1 wherein the adjustable component comprises a motor and wherein the control circuitry is configured to adjust the motor in response to the sensor measurement.

5. The electronic device defined in claim 1 wherein the incoherent self-mixing sensor comprises a light source selected from the group consisting of:
a resonant-cavity light-emitting diode, a superluminescent diode, an edge-emitting light-emitting diode, a surface-emitting light-emitting diode, a spontaneous emission source, and a non-amplified spontaneous emission source.

6. The electronic device defined in claim 5 wherein the light source is configured to emit infrared light having a wavelength of at least 1.5 microns.

7. The electronic device defined in claim 6 further comprising an optical system in the housing, wherein the light source is configured to emit the infrared light through the optical system.

8. The electronic device defined in claim 7 wherein the optical system includes a lens.

9. The electronic device defined in claim 1 wherein the adjustable component comprises a speaker.

10. The electronic device defined in claim 1 wherein the adjustable component comprises a component selected from the group consisting of: a display, a touch sensor, a speaker, a haptic output device, and a motor.

11. The electronic device defined in claim 1 wherein the incoherent self-mixing sensor comprises a light-emitting diode that does not lase and does not form a laser.

12. An electronic device, comprising:
incoherent self-mixing sensors each having a respective light source configured to emit light at a different respective wavelength;
an adjustable component; and
control circuitry configured to adjust the adjustable component using sensor data from the incoherent self-mixing sensors.

13. The electronic device defined in claim 12 wherein each of the incoherent light sources is configured to emit infrared light.

14. The electronic device defined in claim 13 wherein at least one of the incoherent light sources is configured to emit infrared light having a wavelength of at least 2 microns.

15. The electronic device defined in claim 14 further comprising:
a housing containing the incoherent self-mixing sensors; and
a lens in the housing, wherein the incoherent self-mixing sensors are configured to receive light through the lens.

16. An electronic device comprising:
an adjustable component with a movable member;
an incoherent self-mixing sensor having a diode configured to emit light that illuminates the movable member; and
control circuitry configured to adjust the adjustable component using a sensor measurement from the incoherent self-mixing sensor.

17. The electronic device defined in claim 16 wherein the adjustable component comprises a speaker and wherein the movable member comprises a speaker diaphragm.

18. The electronic device defined in claim 17 wherein the diode is configured to receive a portion of the emitted light that has been redirected toward the diode from the speaker diaphragm.

19. The electronic device defined in claim 18 further comprising a housing structure, wherein the control circuitry is configured to prevent contact between the speaker diaphragm and the housing structure by monitoring displacement of the speaker diaphragm using the sensor measurement.

20. The electronic device defined in claim 18 wherein the control circuitry is configured to manage distortion in the speaker by monitoring displacement of the speaker diaphragm using the sensor measurement.

* * * * *